May 27, 1969 J. P. PALMER 3,446,180

INDICATOR APPARATUS FOR SIGNAL RECEIVING TUNING MEANS

Filed March 1, 1967

INVENTOR.
JOSEPH P. PALMER

BY Robert E. Strauss
ATTORNEY

United States Patent Office 3,446,180

Patented May 27, 1969

3,446,180

INDICATOR APPARATUS FOR SIGNAL RECEIVING TUNING MEANS

Joseph P. Palmer, Batavia, N.Y., assignor to Sylvania Electric Products Inc., a corporation of Delaware Filed Mar. 1, 1967, Ser. No. 619,638
Int. Cl. H03j 1/02
U.S. Cl. 116—124.1 6 Claims

ABSTRACT OF THE DISCLOSURE

Reduction of friction in radio receivers and the like is accomplished by elimination of the indicator guide bar and the utilization of areas of minimum contact formed between the movable indicator body and the track on the radio receiver.

*Background of the invention*

This invention relates to indicator apparatus and more particularly to friction reducing indicator apparatus for utilization with signal receiving tuning means.

Most of the higher priced radios in use today employ a linear or slide rule type dial for indicating the frequency to which they are tuned. This type of indicator is superior to that in which the frequency indicator is mounted directly on the shaft of the tuning condenser since it is easier to read, more accurate, and easier to control. Also, it permits the use of an increased tuning ratio which greatly increases the unit's capability of tuning in weak signals.

A disadvantage to the use of the high tuning ratio is the length of time it takes to tune a receiver from one end of the band to the other. In some types of receivers this condition is alleviated by means of push button tuning or flywheel tuning. Flywheel tuning comprises the addition of a weighted disc to the tuning shaft. For either of these two tuning systems to be really effective, the friction losses in the pointed and drive assemblies must be low. The pointer, of course, cooperates with the indicator dial to provide a visual indication of the tuned frequency.

In typical slide rule assemblies of the prior art the pointer carriage or indicator rides on a guide bar which may be a part of the chassis or a separate member provided for the purpose. To reduce friction, expedients such as polishing the edge of the guide and hand fitting the carriage thereto are necessary to reduce binding and wobble. Often a layer of grease or other friction reducing medium is applied to the guide bar. The labor involved and the close tolerances required in the above systems have proven them to be uneffective as remedies. Greased guides are also uneffective since, after a time, the grease hardens and stiffens and accumulates dirt and other airborne contaminants and actually hinders rather than helps, the operation.

*Objects and summary of the invention*

It is an object of the invention to reduce the above-described disadvantages.

It is another object of the invention to enhance the operation of indicator apparatus for signal receiving tuning means.

It is yet another object of the invention to reduce the friction inherent in such systems.

It is still another object of the invention to provide a tuning system that is more economical than those used heretofore.

These and other objects are achieved, in one aspect of the invention, by the provision of an indicator apparatus for signal receiving tuning means which comprises a track and an indicator. The indicator comprises a body portion and a pointer and has means formed thereon adapted to cooperate with mens for holding and moving the body across the track. Friction reducing minimum contact area protuberances are formed between the body and the track.

Indicator apparatus formed in accordance with the above eliminate the guide bar and substantially reduce friction. Because of this the cost of the apparatus is substantially reduced since the labor and expense of hand fitting is avoided as is the need for close tolerances. Greasing also becomes unnecessary.

*Description of the preferred embodiments*

Figures 1, 2, 3:
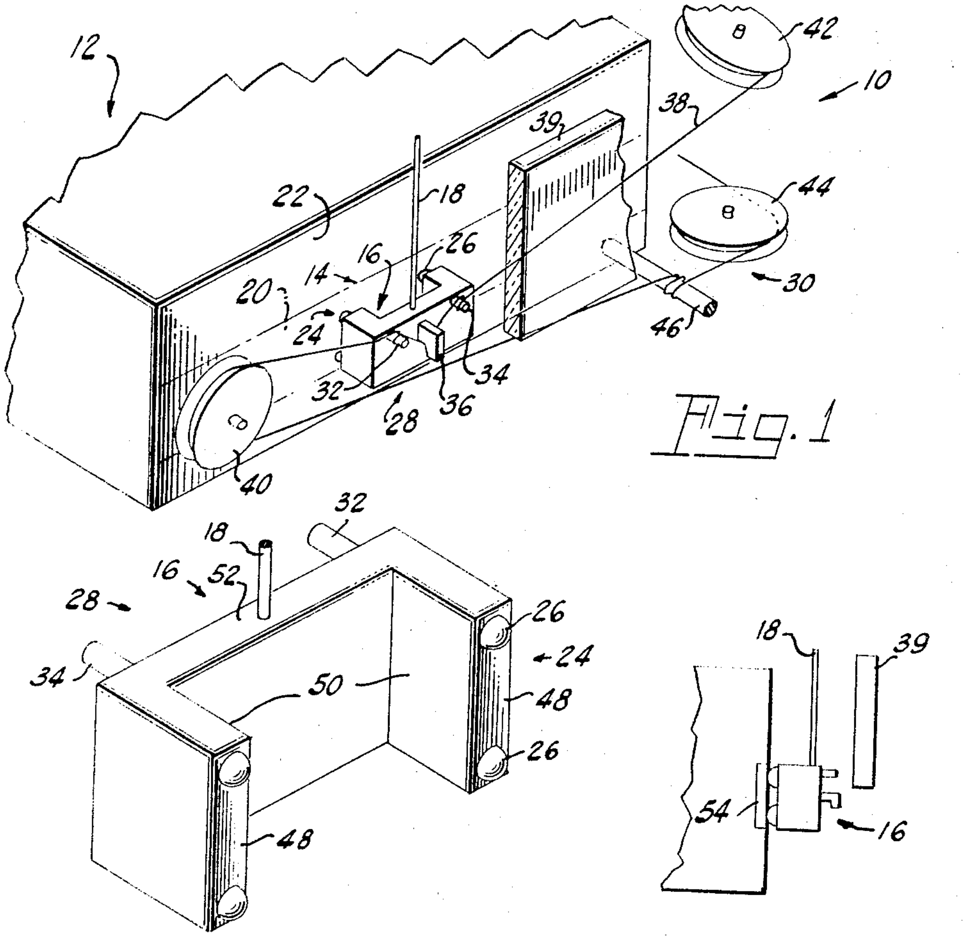
FIG. 1 is a perspective view of an embodiment of the invention with parts broken away and other parts omitted in the interest of clarity.
FIG. 2 is a perspective view of an indicator body.
FIG. 3 is a simplified sectional view of an alternate embodiment of the invention.

For a better understanding of the present invention, together with other and further objects, advantages, and capabilities thereof, reference is made to the following disclosure and appended claims in connection with the above-described drawing.

In referring now to the invention with greater particularity, in FIG. 1 there is shown a signal receiver 10 which may be a radio or similar device. The receiver comprises a chassis portion 12 and indicator apparatus 14 for visually providing information as to the frequency to which the receiver is tuned.

The indicator apparatus 14 comprises a body portion 16 and a pointer 18 and a track 20 (which is completely external of body portion 16) across which body 16 moves. The track 20 is shown in FIG. 1 in phantom lines as being a particular area on the front panel 22 of chassis 12; however, it will be obvious that other forms may be used if desired.

Formed intermediate the body portion 16 and track 20 are friction reducing, minimum contact area protuberances 24; in this instance being shown as hemispherical projections 26 formed on the body 16. Conical projections may also be used as well as any other configuration which provide a point contact rather than a large surface area contact.

Means 28, which are adapted to cooperate with body holding and moving means 30, are formed on a suitable surface of body 16 and comprise a pair of snubbing posts 32 and 34, respectively, and a substantially centrally located supporting nubbin 36. The body holding and moving means 30 comprises a tensionable cord 38 and pulleys 40, 42, and 44 and a tuning shaft 46.

In operation, body portion 16 and its associated pointer 18 are carried across track 20 when the tuning shaft 46 is rotated. This movement is accomplished by virtue of the action of the tensionable cord 38 which is wrapped around snubbing post 32, passes under supporting nubbin 36, and is then wrapped around snubbing post 34. From post 34 the cord 38 passes over pulley 42 and then to a tuner drive pulley, not shown, which is mounted on the rotatable shaft of a variable tuning condenser, as is customary in the art.

In the other direction, cord 38 passes around pulley 40 and thence to tuning shaft 46, which is rotatably journaled within chassis 12. Cord 38 is wrapped around shaft 46 a sufficient number of turns to insure its movement when shaft 46 is rotated. From shaft 46 the cord 38 passes over pulley 44 and continues on to the beforementioned drive pulley. A spring not shown mounted on the drive pulley serves to maintain tension in the cord 38, as is also conventional in the prior art.

So that sufficient tension is provided to keep the indicator body 16 against the track 20—when the track is mounted in a vertical position—the pulleys 40, 42, and 46 are mounted in a plane that is nearer the track 20 than means 28. Thus, as can be seen in FIG. 1, the cord 38 will not only serve to support body 16 but also will hold it against the track. This method of mounting provides a much more stable platform for pointer 18 than one which would merely support body 16 on a cord strung between two points.

Associated with the indicator apparatus 14 and cooperatively positioned with respect thereto is a dial 39 for providing a visual indication of the frequency to which the receiver is tuned. It may be of glass or other suitable transparent material having marked thereon the frequency range of the equipment with which it is being utilized. Mounting of the dial may be accomplished in any convenient manner.

The indicator apparatus thus provided has eliminated internally positioned guide bars and substantially reduces friction. The body portion 16 may be economically fabricated from a variety of materials and in a variety of shapes since expensive hand fitting and close tolerances are no longer necessary.

While, as stated above, a variety of shapes may be utilized for body portion 16 a preferable one is illustrated in FIG. 2 wherein a substantially U shape is employed. The minimum contact area protuberances 24 are formed on the ends 48 of the legs 50 while the means 28 are formed to project outwardly from the closed end or leg connecting section 52. This configuration provides sufficient support for the structure and substantially reduces the weight.

Further reductions in friction can be achieved by using—at least at the point of contact—a material having a low static coefficient of friction; i.e., a static coefficient of friction of about .1 or less. An excellent material for this purpose is polytetrafluoroethylene which has a static coefficient of friction of .04 on steel. It is also possible to provide a track formed from this material, as is illustrated in FIG. 3, wherein a track 54 is shown fitted within the front wall 22 of chassis 12. Obviously, the track 54 may merely be attached to the outside of the chassis or may be mounted in a position completely removed from the chassis.

It will thus be seen that there is here provided an invention that obviously advances the art. The disadvantages of the prior art, namely: the high cost; and the high amount of friction, have been obviated. The guide bar and the need for lubrication have also been eliminated.

The indicator apparatus may also utilize existing tuning aids; e.g., it is within the scope of the invention to attach a weighted flywheel to the tuning shaft 46 to reduce the time necessary for stop to stop movement of the pointer across the dial.

Thus, while there have been shown and described what are at present considered the preferred embodiments of the invention, it will be obvious to those skilled in the art that various changes and modifications may be made therein without departing from the scope of the invention.

I claim:

1. An indicator apparatus for a signal receiving tuning device, said device having at least one planar surface, said apparatus comprising: a track formed on said planar surface of said tuning means; an indicator formed to ride said track comprising a body portion and a pointer, said body portion having at least two sides, one of which is adapted to engage said track and the other of which is provided with a plurality of projections extending therefrom; means formed to provide, at one portion therof, engagement with said projections to provide the sole support for said indicator body and, at another portion thereof, engagement with a means for moving said indicator body across said track; and friction-reducing minimum contact area protuberances formed on either said indicator body or said track and contacting the other.

2. The invention of claim 1 wherein an indicia-bearing plate is operatively positioned with respect to said pointer.

3. The invention of claim 1 wherein said friction-reducing minimum contact area protuberances are formed on said side of said indicator body which engages said track.

4. The invention of claim 3 wherein said indicator body portion is substantially U shaped and said friction-reducing minimum contact area protuberances are formed at the ends of the legs of the U.

5. The invention of claim 3 wherein said track is formed from a material having a low static coefficient of friction.

6. The invention of claim 3 wherein said body portion is formed from a material having a low static coefficient of friction.

References Cited

UNITED STATES PATENTS

| | | | |
|---|---|---|---|
| 2,443,745 | 6/1948 | Montgomery ------ | 116—124.1 |
| 2,582,380 | 1/1952 | Groenenberg ------ | 116—124.1 |
| 2,931,477 | 4/1960 | Metzger ---------- | 308—238 X |
| 3,301,610 | 1/1967 | Packett et al. -------- | 308—3.8 |

LOUIS R. PRINCE, *Primary Examiner.*

D. M. YASICH, *Assistant Examiner.*

U.S. Cl. X.R.

308—3